United States Patent Office 3,361,663
Patented Jan. 2, 1968

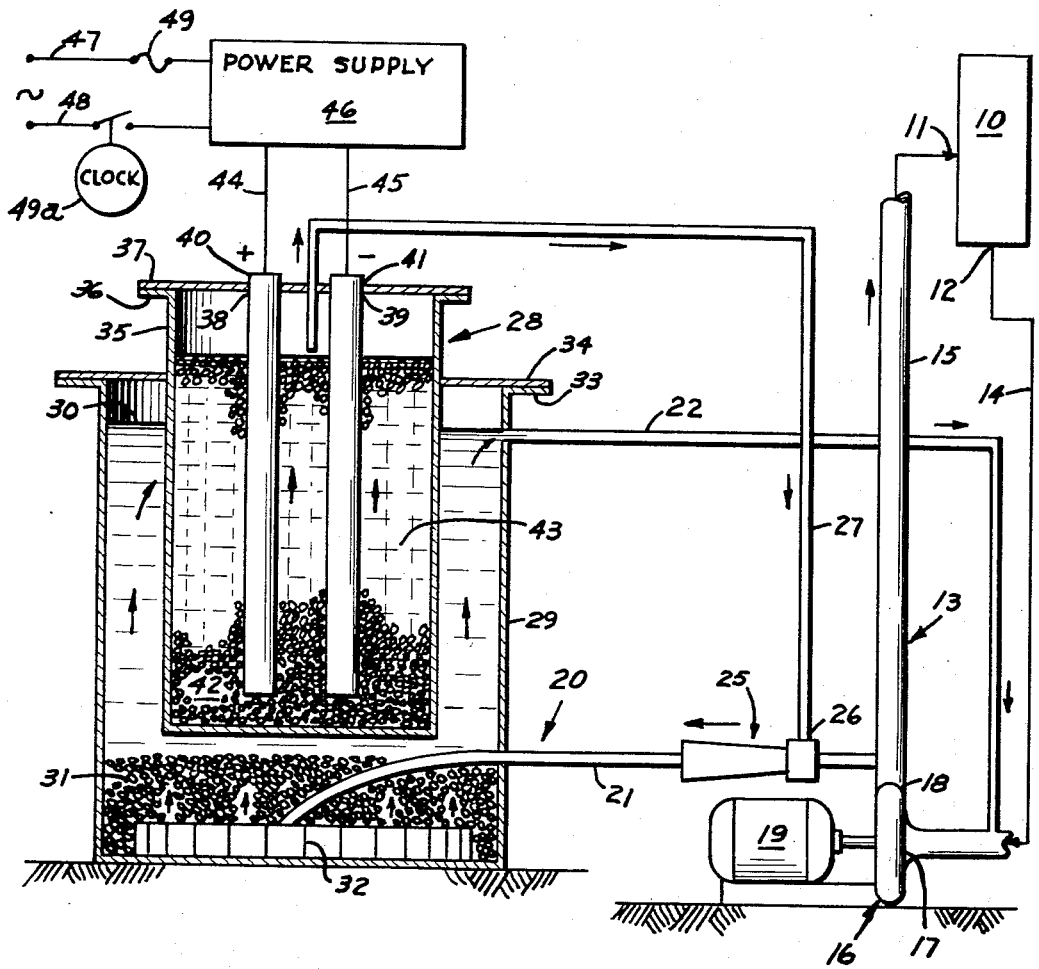

3,361,663
SANITIZING SYSTEM
William Bruce Murray, 929 Terraine Ave., Long Beach, Calif. 90804, and John W. Christensen, 10534 Wiley Burke, Downey, Calif. 90241
Filed Apr. 14, 1964, Ser. No. 359,696
5 Claims. (Cl. 204—278)

This invention relates to the automatic sanitation of swimming pool water, and to automatic control over its acidity, alkalinity, and pH.

The maintenance of a clean and wholesome body of water for swimming purposes requires constant control over algae, bacteria, and the like. This control is conventionally accomplished by chlorinating the water. In addition to chlorine, the other halogens except fluorine also function to good advantage. However, from the standpoint of availability of the product, familiarity of the user with the hazards of handling it, and general convenience, chlorine is the preferred halogen for use in sanitation processes.

Classically, chlorine is added to the water to be sanitized either by direct injection as an elemental gas, or as a component of an unstable compound such as sodium hypochlorite. Either way, chlorine is made available in the water, and there it reacts with the water to form hydrochloric acid and oxygen. In one reaction, acid is built up in the pool, and in the other, a considerable amount of salt is added. In either event, it is found necessary to maintain pH control by adding an acid or a base, either of which techniques is a nuisance. Furthermore, these are not very successful techniques, particularly in home swimming pools, because the average home pool owner is not capable of keeping the pH of his pool within reasonable limits by using this method. Most pool owners either add too much or too little, and often too soon or too late. If the pH is not kept within a comparatively narrow range, the water becomes uncomfortable for the swimmer, and also becomes less sanitary, because the oxidation reactions which accomplish the sanitizing effects are less efficient outside of a narrow pH range.

It is evident that an automatic device which is capable of maintaining residual chlorine and pH levels at all times is a desirable product. In fact, many devices for accomplishing these functions have been suggested, but all have had their shortcomings. Among the principal shortcomings in the prior art is the need to service chlorine-generating cells frequently, usually with materials which are quite hazardous to handle. Furthermore, such cells often operate at current densities which are excessive, and which generate high temperatures that are deleterious to the materials of which the device is made. Furthermore, they often produce acidic or basic effluents which are hazardous to dispose of and are damaging to the cell.

It is an object of this invention to provide a system which seldom needs servicing— perhaps only once a year, which system is self-regulating as to temperature, and which produces a neutral effluent with an optimum residual chlorine level in the pool.

The preferred embodiment of a sanitizing system according to this invention is used in connection with a pool which has an inlet and an outlet. Water is pumped from the outlet to the inlet past a source of halogen gas, which gas is injected into the water. The halogen-bearing water then passes to a bed of material that is substantially insoluble in water and is reactant with halogen-water solutions. It passes through the bed and a supernatant pool and returns to the pool inlet.

According to a preferred but optional feature of this invention, a recirculation conduit is connected to the pool inlet and outlet, and a pump having an inlet and an outlet is connected to the conduit in fluid communication with the pool outlet and inlet, respectively. A bypass conduit is connected to the recirculation conduit on the outlet and on the inlet side of the pump. The source of halogen gas is connected through injection means to the bypass conduit. The bed and supernatant pool are placed in the fluid path of the bypass conduit, so that water in the bypass conduit passes through the bed. Supernatant liquid is discharged through the bypass conduit to the pump inlet.

According to a preferred but optional feature of the invention, the material of the bed is calcium carbonate.

According to still another preferred but optional feature of this invention, the source of chlorine gas is an electrolytic cell, which is airtight. Withdrawing gas from the airtight cell creates a negative pressure which, when the pump is shut down, acts to draw replacement water into the cell.

The above and other features of this invention will be fully understood from the following detailed description and the accompanying drawings in which the single figure is a side elevation of the presently preferred embodiment of the invention, partly in cutaway cross-section, and partly in electrical schematic notation.

The invention is used in combination with a swimming pool 10 which has a pool inlet 11 and pool outlet 12. A recirculation conduit 13 has two legs 14, 15, leg 14 being connected to the pool outlet, and leg 15 being connected to the pool inlet. A pump 16 has an inlet 17 and an outlet 18. Inlet 17 and outlet 18 are respectively connected to legs 14 and 15 of the recirculation conduit. This recirculation system is common to most swimming pools. It forms part of the filter circuit. The filter (not shown) is ordinarily coupled in conduit 13. A motor 19 drives the pump.

A bypass conduit 20 has two legs 21, 22. Leg 21 taps leg 15 of the recirculation conduit near the outlet side of the pump, and leg 22 taps leg 14 of the recirculation conduit near the inlet side of the pump. The pump thereby creates a differential pressure between legs 21 and 22 of the bypass conduit.

Leg 21 includes injection means 25 for the purpose of injecting a sanitizing substance such as chlorine, bromine, or iodine gas into water flowing through the bypass conduit. In the example shown, the injection means comprises a simple eductor nozzle with a straight-through passage in line with leg 21 and a side tapped inlet 26 at the throat of the injection means, which inlet is connected through a tube 27 to a source 28 of sanitizing material, in this case an electrolytic cell for generation of chlorine gas.

In the stream of the bypass conduit, and therefore as an integral part thereof, there is a tank 29 containing a pool 30 of supernatant fluid which overlays a bed 31 of a substantially insoluble material which will be discussed later. Beneath this bed, there is disposed a diffuser 32 through which water from leg 21 passes so as to percolate upwardly through the bed without excessive channeling. Water from this pool flows to and through leg 22 to return to the recirculation conduit.

Tank 29 comprises an open-mouth vessel with a peripheral flange 33. Secured to the top of this peripheral flange is an annular cover 34 which is sealingly fitted to the flange so that tank 29 is fluid-tight, and water can escape therefrom only through leg 22.

Source 28 comprises an open-mouthed vessel 35 with a flange 36 and an insulating, airtight cover 37. The insulating cover has a pair of openings 38, 39 which pass and make a fluid-sealing fit with a pair of electrodes 40, 41. The electrodes project downwardly into the vessel. Vessel 35 is at least partially immersed in pool 30 in heat transfer contact therewith so that water flowing through tank 29 cools the electrolytic cell. Because vessel 35 is fluid tight, a vacuum can be formed therein by the action of the eductor nozzle, and certain conditions draw water back into the vessel to replace that which is used up by electrolytic-action, or vaporized by heat of the electrolytic process.

Within the electrolytic cell and packed around the electrodes, there is a quantity of halogen-containing material 42 with an amount of supernatant water 43 therein, all of which will be discussed below.

The region above the supernatant water 43 is closed, except through tube 27. Tube 27 terminates above the surface of water 43 so as to convey away the gases generated therein.

Leads 44, 45 are connected to electrodes 40, 41 respectively, and connect to a direct current power supply 46. This power supply has a pair of terminals 47, 48 adapted to be connected to any desired source of alternating current. A fuse 49 is connected in one leg of this circuit. A time clock and switch 49a which is conventionally provided to control the filter pump motor is most pools controls both power supply 46 and motor 19, turning on and shutting off both simultaneously in accordance with its setting. Clock and switch 49a are connected in the other leg of the input circuit.

The operation and supply of this device will now be described.

The fluid flow system is evident from the drawings. Water is withdrawn by the pump from the swimming pool through pool outlet 12 and is recirculated by it to the pool inlet 11. This is a steady recirculation operation, and the greater proportion of the water goes straight through in this pattern (usually through a filter), thereby to provide a continuously circulating pattern of water movement in the pool so as to minimize sedimentation on the bottom of the pool in accordance with known principles.

The portion of the recirculation which is of primary importance to this invention begins at leg 21 where there is a positive differential pressure (derived from the pump) relative to the pressure in leg 22. Therefore an amount of water will flow through the bypass conduit proportional to the size of the openings, to the flow conditions past the openings, and to the resistance to fluid flow through the recirculation and bypass conduits. Suffice it to say that a substantial volume of liquid will flow through the bypass conduit, preferably on the order of about 2 gallons per minute in connection with a 25,000 gallon pool in which the general recirculation pattern includes a flow of about 45 gallons per minute through leg 15.

Assuming the electrolytic cell to be in operation producing elemental chlorine gas, and its operation will be described in detail below, then chlorine gas will be available in tube 27 and will be drawn into the liquid flowing in leg 21 by the action of the injector means. This forms a negative pressure in vessel 35 above liquid 43. Importantly, when the time clock cuts off the system by stopping the pump, the system remains flooded and full of water, but the pressurized flow which caused the negative pressure stops. Then the negative pressure will draw water back into the cell, which replenishes that which was used up by electrolytic action. Thus there is no need to manually add water to the cell, nor to provide other supply means. However, the water capacity of the cell should be great enough to last for the expected time of an operation cycle (which might be interrupted now and then for this replenishment to take place) and the vessel should not be placed at an elevation too great for the water to be drawn in by the negative pressure. An elevation not more than about 4 feet above pool level is usually suitable.

The water in leg 21 containing gaseous chlorine (after injection in the injector means) flows to diffuser 32 and gradually seeps upward through bed 31, there undergoing the reactions yet to be described. After passing through bed 31, the liquid then becomes the supernatant fluid 30 heretofore referred to, which flows upwardly through tank 29 around vessel 35 in heat-transfer relationship therewith and cooling the same, thereafter to flow through leg 22 and back to the inlet side of the pump. At this place, the fluid will re-enter the recirculation flow and flow toward the pool inlet. Of course a minor portion of it will be recirculated through the bypass conduit but in an amount which is quite small and which raises no inherent problems.

It will be understood that the bypass conduitry shown is merely the simplest type, and which can operate off the differential pressure provided by an already existing pumping circuit. Also, the injector means for injecting the chlorine gas into the bypass conduit could utilize other devices, but again the form shown is utilized because of its simplicity. For example, boost pumps and the like might be used with the eductor or in place of the eductor, and also water separate from the recirculation conduit might be used. However, inasmuch as any pool has a filter circuit which utilizes a pump already, and inasmuch as it is desired to secure positive and early diffusion and dilution of the chlorine-containing liquids, it is best designed to incorporate the fluid circuits as shown.

In this invention, temperature control of the electrolytic cell is maintained by the heat-transfer relationship with water flowing through the bypass conduit.

The reaction within bed 31 will now be described. The material of bed 31 is a material substantially insoluble in water but which is reactant with halogenated water solutions. The presently preferred material is calcium carbinate, and the presently preferred halogen is chlorine, which is one member of the class comprising chlorine, bromine, and iodine, which class defines halogen suitable for swimming pool use.

The reactions in this portion of the system are as follows: when elemental chlorine is added to water, hydrochloric acid and hypochlorous acid are formed as follows:

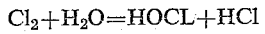

$$Cl_2 + H_2O = HOCL + HCl$$

Repeated chlorination of a swimming pool water with gaseous chlorine generates so much hydrochloric acid that without treatment the residual alkalies in the water are soon destroyed and the water tends to become acidic. Since swimming pool water must not be allowed to become acidic, steps are conventionally taken to counteract the formation of excess hydrochloric acid. Customarily, this is done by regularly adding any of several alkaline compounds to the pool. Both hand feeding by the pool operator or mechanical feeding are employed for this purpose. In each case, frequent chemical tests of the water are required, because the amount of alkali needed varies continuously, and so the process is not automatic or self-regulating.

Bed 31 overcomes this situation in systems where the water is treated with elemental chlorine. It is not useful with pools chlorinated with any of the hypochlorites or chlorinated cyanurates. Calcium carbonate is classed as generally insoluble in water. Its solubility is about 16 p.p.m., and if it is used in the customary manner for alkalizing pool water, it would be of no value whatever for pH control. In fact, it would simply cloud the water and plug the filter, in short, be absolutely unsuitable for use in swimming pools. However, in connection with this invention, a chemical which has heretofore been considered utterly unsuitable for swimming pool operations performs the task of overcoming the acidic effect of the chlorine solution described as passing through leg 21 from the eductor 25 electrolytic cell arrangement 28. The chlorine solution, on passing through the calcium carbonate bed 31, combines with this material forming a neutral solution of hypochlorous acid as follows:

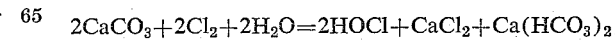

$$2CaCO_3 + 2Cl_2 + 2H_2O = 2HOCl + CaCl_2 + Ca(HCO_3)_2$$

Both of the end products containing calcium (calcium chloride and calcium bicarbonate) are completely soluble in the solution, and the desired sterilizing product (hypochlorous acid) is obtained at a solution pH of pH 7. Because the sterilizing solution is at neutrality, the normal operating pH of the pool (7.2–7.9) is left unchanged and as a result the alkaline balance is undisturbed. It is conceivable therefore that the pool water will remain buffered for an entire yearly operating period without the need for additional chemicals (acids or alkalies). Note that the hypochlorous acid provided to the pool at the neutral pH 7 value is in the strongest free chlorine, water-combined form. It is the most powerful oxidizing form of chlorine and in this capacity is the most desirable bleach, germicide, fungicide and sterilizing agent.

When the water through leg 21 is supplied with elemental chlorine and is then passed through the bed of calcium carbonate, the calcium carbonate will react chemically with any excess hydrochloric acid and prevent the pH from dropping below 7.0 as follows:

$$2CaCO_3 + 2H_2O + 2Cl_2 = 2HOCl + CaCl_2 + Ca(HCO_3)_2$$

The calcium bicarbonate which results from the above reaction is quite soluble and passes out into the pool where it is available to neutralize the hydrochloric acid which is formed as the hypochlorous acid decomposes in the pool as follows:

$$2HOCl = O_2 + 2HCl$$
$$2HCl + Ca(HCO_3)_2 = CaCl_2 + 2H_2CO_3$$

The theoretical amount of calcium bicarbonate produced exactly balances the theoretical amount of hypochlorous acid resulting from the chlorination. In actual practice, some of the hypochlorous acid combines with other materials in the pool, leaving a small excess of calcium bicarbonate. This small excess serves to raise the pH of the pool water to a value somewhat above 7.0. On various test pools, it has been found that the pH tends to stabilize at a level approximately 7.5 which is quite acceptable for good swimming pool chemistry. Such water does not attack the calcium carbonate when the pump is turned off, because its pH is well above neutrality.

The excess amount of calcium bicarbonate in the water is limited which prevents the pH from rising above 8.0. This limiting process occurs when water passes through bed 31. The hydrochloric acid formed as the water is chlorinated instantly destroys calcium bicarbonate in that water. If the bicarbonate level in the pool water is so high that all of the hydrochloric acid formed during chlorination is neutralized, and an excess of calcium bicarbonate remains, then the effluent water from vessel 35 will have a pH above 7.0, and no chemical reaction will occur in that vessel. Because the calcium carbonate is insoluble, nothing will be added to the water at that time, and both the pH and the bicarbonate concentrate will thereby be reduced by the chlorine gas.

As can be seen from the foregoing, the reaction in vessel 35 controls both the upper and lower pH values, and this within the range most suitable for swimming pool water both as to comfort and as to sanitation.

The material utilized in the electrolytic cell will now be discussed in detail. It is an object of this invention to provide a substance which, when electrolyzed, will produce gaseous chlorine in substantial quantities from a supply which need be replenished only at very infrequent periods, such as annually, utilizing a container for vessel 35 suitable for a range of pool sizes. In order to understand the background for selecting the specific chloride compounds to be utilized, consider the classic electrolysis of sodium or potassium chloride. The electrolysis reactions for these are as follows:

$$2KCl + 2H_2O = 2KOH + H_2 + Cl_2$$
$$2NaCl + 2H_2O = 2NaOH + H_2 + Cl_2$$
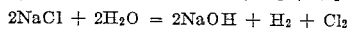
Cathode    Anode Note in each of the above cases that the caustic formed at the cathode will substantially reduce the liberation of chlorine gas at the anode because it will combine with it to form a hypochlorite product which remains behind in the electrolytic cell. This hypochlorite formation is as follows:

$$2XOH + Cl_2 = XOCl + XCl + H_2O$$

where X is a single atom cation. Inasmuch as the object is to obtain free chlorine gas at an optimum rate, the dissociation of sodium and potassium salts is quite impractical and inefficient.

Similarly, the electrolysis of ammonium chloride is inefficient even though it behaves quite differently. For example, its classical electrolysis equation is as follows:

$$2NH_4Cl = 2NH_3 + H_2 + Cl_2$$
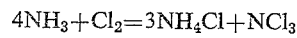
Cathode    Anode

The ammonia and chlorine gases liberated in this reaction form nitrogen tri-chloride and ammonium as follows:

$$4NH_3 + Cl_2 = 3NH_4Cl + NCl_3$$

The products formed in the latter equation would be removed by a suction tube and put in solution with the pool water. However, passage of the chlorine through the concentrated brine in the vicinity of the anode reacts to form nitrogen tri-chloride in aqueous solution along with hydrochloric acid as follows:

$$3Cl_2 + NH_4Cl = NCl_3 + 4HCl$$

In both of these reactions, chlorine gas will combine with the other products in both the gaseous and liquid state, and therefore the process is inherently wasteful and possibly dangerous.

To overcome the disadvantages in the prior art as evidenced by the above classical reactions, one may start with the classical dissociation of hydrochloric acid in seeking a more ideal source.

This reaction is as follows:

$$2HCl = H + Cl_2$$
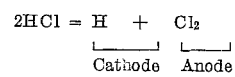
Cathode    Anode

This process is one which is very efficient and might be feasible. However, shipping and handling of HCl is both dangerous and costly. Furthermore, the amount of chlorine produced by the dissociation of the limited quantity of hydrogen chloride available per gallon of liquid is in itself a disadvantage because either a very large cell or more frequent servicing will be required.

This invention obtains the advantages of the classical dissociation of hydrochloric acid while overcoming the above disadvantages in using a group of safe metallic compounds which may be described as metallic halides. These materials are preferably selected from the group consisting of metallic halides which in solutions are acidic in nature typical of which are aluminum chloride and ferric chloride, which are the presently preferred compounds, especially aluminum chloride. These latter compounds are available in dry crystal form which generally contain six waters of hydration. When these crystals are added to water, they dissolve readily, and produce a strongly acidic reaction to litmus. The metallic ions produced remain complexed due to the acidic nature of the solution, while the chlorides ionize upon liberation to form hydrochloric acid.

For example, aluminum chloride ($AlCl_3$) is a quaternary strong electrolyte which exerts a four-fold osmotic pressure in dilute solutions corresponding to the four ions which are formed. Hydrolysis of the cations does not exceed 3.8% even in very dilute solutions. The initial ionic equation is as follows:

(a) $3AlCl_3 = AlCl_2^+ + AlCl^{++} + Al^{+++} + 6Cl^-$
(b) $AlCl_3 + 3H_2O = Al(OH)_3 + 3HCl$
(c) $AlCl_2^+ + OH^- = AlCl_2(OH)$
(d) $AlCl + 2OH^- = AlCl(OH)_2$

In concentrated solutions, the aluminum ion will remain in solution as Al$^{+++}$. When direct current is applied to this solution in an electrolytic cell, the metallic ions, being positively charged, migrate to the cathode where they accumulate without deposition on the electrode. Because in acidic solutions it takes less energy to discharge hydrogen ion than to convert the aluminum ion to metallic aluminum, hydrogen gas will be discharged. Simultaneously, chlorine gas is evolved at the anode and is directly discharged without further reaction. Therefore, the electrolytic dissociation can be represented by the following equation:

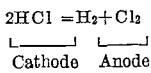

It will thereby be seen that large quantities of chlorine, limited only by that contained in the salt, and not primarily by the volume of the solution, may be obtained from a solution which is kept at or under saturation all the time of the operation of the cell. As the amount of hydrochloric acid available gradually becomes depleted by lessened availability of the aluminum or ferric chloride, the pH raises until the conditions approximating Equations b through a above take place within the electrolytic cell. As the latter equations begin to occur, then there will be evidence of deposition of aluminum on the cathode indicating that it is time to stop the operation of the cell and recharge it with a new supply of electrolyte.

The above discussion relating to the reactions of aluminum chloride is directly pertinent to those of ferric chloride, and also to the homologous compounds of bromine and iodine.

These metallic halides are quite safe to handle, and can closely be packed into the vessel and the electrodes forced down into the packed crystals. Thereafter, water is poured into the container and after a very short period of operation, it will be seen that a cavitation effect occurs contiguous to the electrodes so that they do not stand in contact with the crystals, but instead stand in contact with a pool of saturated solution of aluminum chloride. Migration of the ions is readily obtained through the water which fills the interstitial space as well as by some electron transfer across the crystals themselves.

A compound closely resembling hydrochloric acid but without the inconvenience of being handled as a liquid (and therefore having many of the advantages of metallic halides as aforesaid) is a dry compound consisting of common salt (NaCl) and sodium acid sulfate (NaHSO$_4$). When added to water and placed in the electrolytic cell, in the stoichiometric quantities of the following equation, the ingredients combine to form hydrochloric acid as follows:

$$NaCl + NaHSO_4 = Na_2SO_4 + HCl$$

Application of a current dissociates the hydrochloric acid into elemental chlorine and hydrogen as before with the soluble salt sodium sulfate remaining in solution and not taking part in the reaction.

With the foregoing in mind, the advantages of the system in total as well as of its subcombination parts can readily be appreciated. For example, in connection with the cooling of the electrolytic cell by the heat exchange relationship between the cell and its surrounding vessel, it should be recalled that heat is generated by the electrolytic process. The amount of power, and hence the amount of halogen, which can be generated by a particular electrolytic cell is limited to that level which will not overheat the cell. By cooling the electrolyte, more power can be applied, and hence more halogen can be generated from a cell of given size. Furthermore, the resistance of the electrolyte changes substantially with a change in temperature, the resistance dropping as the temperature increases. As an example, an electrolytic cell containing a solution of aluminum chloride which draws 10 amps at 80° F. would draw approximately 20 amps at 160° F. Controlling the temperature of electrolyte is therefore very important in controlling the output of the cell and in the design, regulation and operation of the power supply.

By controlling the temperature of the cell, the vessel itself may be made of inexpensive materials, such as polyethylene or ordinary crown glass. However, both of these materials can be rendered unsuitable by excessive heat, and were the heat not to be controlled, much more expensive materials would have to be used. By means of the temperature control, relatively inexpensive and much more convenient materials can be used to construct the vessel for the electrolytic cell.

The vacuum exerted on the electrolytic cell while in operation provides greater advantages than merely the injection of the gas into the fluid stream. It should be recalled that generation of the halogen takes place within a liquid medium. Therefore, maintaining the cell under a partial vacuum increases the efficiency of the cell by drawing off the gases more rapidly and more vigorously. Because the envelope of gas bubbles which forms around the electrodes increases the resistance and lowers the production rate of the electrolytic cell, it is important to get rid of this envelope as rapidly as possible. Evacuation of the cell does in fact reduce this envelope.

The maintenance of the fluid level in the cell is a considerable advantage both in the fact that it is maintained automatically, and also because of its dilution by byproducts of the reaction. As the crystals dissolve and are removed from the cell by electrolysis, space becomes available in the chamber for additional water. In practice, there is substantially more liquid in the cell chamber at the end of the process than there was at the beginning, thereby providing for dilution of any byproducts which may have been formed.

This invention is not to be limited by the embodiments shown in the drawings, and described in the description, which are given by way of example and not of limitation, but only in accordance with the scope of the accompanying claims.

We claim:

1. A sanitizing system for use in combination with a swimming pool, which pool has an inlet and an outlet, said system comprising: a recirculation conduit connected to said pool inlet and outlet; a pump having an inlet and an outlet connected to said recirculation conduit in fluid communication with the pool outlet and inlet, respectively; a bypass conduit having an inlet and an outlet connected to the recirculation conduit on the outlet and on the inlet side of the pump respectively; an electrolytic cell as a source of gas selected from the group consisting of chlorine, bromine, and iodine; injection means for injecting the gas into the stream in the bypass conduit; a tank for containing a supernatant pool overlaying a bed of material which is substantially insoluble in water and is reactant with an aqueous solution of said gas, the injector means injecting said gas into the bypass conduit before its entry into said tank, said bypass conduit discharging into said tank and through said bed, said bypass outlet being connected to said tank and adapted to withdraw supernatant liquid therefrom.

2. A sanitizing system according to claim 1 in which the injection means comprises an eductor nozzle, having a low pressure port which is connected to the cell to receive said gas therefrom, the cell being closed, generation of low pressure in the cell enabling water to flow into the cell from the bypass conduit from time to time to replace the water consumed in electrolysis.

3. A sanitizing system according to claim 1 in which a portion of the cell is in heat-transfer relationship with fluid flowing through the bypass conduit, whereby to cool the cell.

4. A sanitizing system according to claim 1 in which a portion of the cell is disposed in the tank thereby to contact the supernatant fluid and to be cooled by the same.

5. A sanitizing system according to claim 4 in which the injection means comprises an eductor nozzle having a low pressure port which is connected to the cell to receive said gas therefrom, the cell being closed, generation of low pressure in the cell enabling water to flow into the cell from the bypass conduit from time to time to replace the water consumed in electrolysis.

References Cited

UNITED STATES PATENTS

| | | | |
|---|---|---|---|
| 2,385,903 | 10/1945 | Winkelmann | 204—152 |
| 2,887,444 | 5/1959 | Lindstaedt | 204—152 |
| 3,092,566 | 6/1963 | Negus | 204—152 XR |
| 3,223,242 | 12/1965 | Murray | 210—192 |

JOHN H. MACK, *Primary Examiner.*

D. R. JORDAN, *Assistant Examiner.*

UNITED STATES PATENT OFFICE
CERTIFICATE OF CORRECTION

Patent No. 3,361,663                                   January 2, 1968

William Bruce Murray et al.

It is hereby certified that error appears in the above numbered patent requiring correction and that the said Letters Patent should read as corrected below.

Column 4, line 24, for "-binate" read -- -bonate --; line 26, for "halogen" read -- halogens --; column 7, lines 14 and 15, for

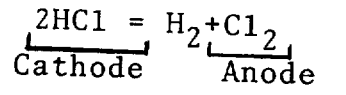          read          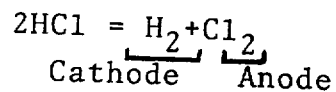

Signed and sealed this 18th day of February 1969.

(SEAL)
Attest:

Edward M. Fletcher, Jr.
Attesting Officer

EDWARD J. BRENNER
Commissioner of Patents